(12) United States Patent
Wang et al.

(10) Patent No.: US 9,100,584 B1
(45) Date of Patent: Aug. 4, 2015

(54) CAMERA ARRAY CORRECTION METHOD

(71) Applicant: ALTEK SEMICONDUCTOR CORPORATION, Hsinchu (TW)

(72) Inventors: Hsin-Te Wang, Nantou County (TW); Kai-Yu Tseng, Changhua County (TW); Wen-Yan Chang, Miaoli County (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/278,660

(22) Filed: May 15, 2014

(30) Foreign Application Priority Data

Apr. 18, 2014 (TW) .............................. 103114254 A

(51) Int. Cl.
*H04N 5/232* (2006.01)
*H04N 5/235* (2006.01)

(52) U.S. Cl.
CPC ......... *H04N 5/2355* (2013.01); *H04N 5/23232* (2013.01)

(58) Field of Classification Search
CPC ......... H04N 9/735; H04N 9/646; H04N 9/71; H04N 1/60; H04N 9/093; H04N 9/76; H04N 5/2355; H04N 5/23232
See application file for complete search history.

(56) References Cited

U.S. PATENT DOCUMENTS

| 2009/0015689 A1* | 1/2009 | Murayama ................. 348/229.1 |
| 2010/0231748 A1* | 9/2010 | Takeda ........................ 348/229.1 |
| 2012/0188336 A1* | 7/2012 | Ogasahara ..................... 348/43 |

* cited by examiner

*Primary Examiner* — Aung S Moe
(74) *Attorney, Agent, or Firm* — Bacon & Thomas, PLLC

(57) ABSTRACT

The present disclosure illustrates a camera array correction method. The method comprises steps of calculating the gain values between the images captured by cameras with the pre-measured characteristic of each of the cameras. By such correction method, the different cameras in the camera array can capture images of the same brightness values and color values simultaneously. In addition, the huge computation requirement due to the increasing of the cameras can be reduced effectively.

7 Claims, 2 Drawing Sheets

CAMERA ARRAY CORRECTION METHOD

CROSS-REFERENCE TO RELATED APPLICATION

This application claims the benefit of Taiwan Patent Application No. 103114254, filed on Apr. 18, 2014, in the Taiwan Intellectual Property Office, the disclosure of which is incorporated herein in its entirety by reference.

BACKGROUND OF THE INVENTION

1. Field of the Invention

The present disclosure relates to a camera array correction method, in particular, to a correction method capable of make cameras in a camera array having substantially equal brightness and color.

2. Description of the Related Art

A camera array is formed by multiple cameras, to capture multiple images at the same time. These original images can be used in many applications, and the main application is to combine these original images to form an image. However, when the brightness values or color values of the original images have many differences, it is more difficult to combine or merge the original images.

In prior art, each of the cameras is installed with an auto exposure algorithm and an auto white balance algorithm individually, so that each of the cameras can operate independently. However, when number of the cameras increase and each camera is installed with different algorithm, rapid increase in computation is required to make the images captured by this camera array having approximate brightness values or color values. In addition, the cameras are located at different positions and their view angles are different, so brightness or color of the images captured by the sensing element array are easily affected and the exposures of these images are hard to have consistency with each other.

SUMMARY OF THE INVENTION

To solve the above-mentioned problem, one of objectives of exemplary embodiments of the present disclosure is to provide a camera array correction method capable of enabling cameras of the camera array to generate images with the same of similar brightness or color, so as to generate image features with consistency.

Another objective of exemplary embodiments of the present disclosure is to provide a camera array correction method capable of pre-measuring characteristic of each of cameras, for further compensation between cameras in later image capturing, so that the big amount of computation due to increasing of cameras can be reduced efficiently.

An exemplary embodiment of the present disclosure provides a camera array correction method which is adapted for an image correction between a first camera and a second camera. The camera array correction method comprises the following steps: using the first camera and the second camera to shoot a light source to generate a first image and a second image; calculating a first red image gain value, a first green image gain value, a first blue image gain value, a second red image gain value, a second green image gain value and a second blue image gain value, according to a first red image data, a first green image data and a first blue image data of the first image, and a second red image data, a second green image data and a second blue image data of the second image; calculating a red image gain ratio, a green image gain ratio and a blue image gain ratio of the second image, wherein the red image gain ratio is a ratio of the second red image gain value and the first red image gain value, and the green image gain ratio is a ratio of the second green image gain value and the first green image gain value, and the blue image gain ratio is a ratio of the second blue image gain value and the first blue image gain value; generating a red image correction gain, a green image correction gain and a blue image correction gain of a third image when the first camera and the second camera shoot an external environment to generate the third image and a fourth image respectively; multiplying the red image gain ratio, the red image correction gain and the second red image data to obtain corrected red image data, and multiplying the green image gain ratio, the green image correction gain and the second green image data to obtain corrected green image data, and multiplying the blue image gain ratio, the blue image correction gain and the second blue image data to obtain corrected blue image data; correcting the fourth image to generate a corrected image according to the corrected red image data, the corrected green image data and the corrected blue image data, to enable the corrected image and the third image having substantially equal image features.

Preferably, the first red image data or the second red image data comprises a brightness value or a white balance value of a red component image, the first green image data or the second green image data comprises a brightness value or a white balance value of a green component image, and the first blue image data or the second blue image data comprises a brightness value or a white balance value of a blue component image.

Preferably, a resolution of the second camera is lower than that of the first camera.

Preferably, the resolution of the corrected image is converted to be equal to that of the third image by an interpolation process.

Preferably, the first red image gain value is a ratio of the first green image data and the first red image data, the first green image gain value is a ratio of the first green image data and the first green image data, the first blue image gain value is a ratio of the first green image data and the first blue image data, the second red image gain value is a ratio of the first green image data and the second red image data, the second green image gain value is a ratio of the first green image data and the second green image data, the second blue image gain value is a ratio of the first green image data and the second blue image data.

Preferably, the image features comprise a white balance value and an auto exposure value.

Preferably, both of the corrected image and the third image are applied to subsequent image process.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Figure 1:
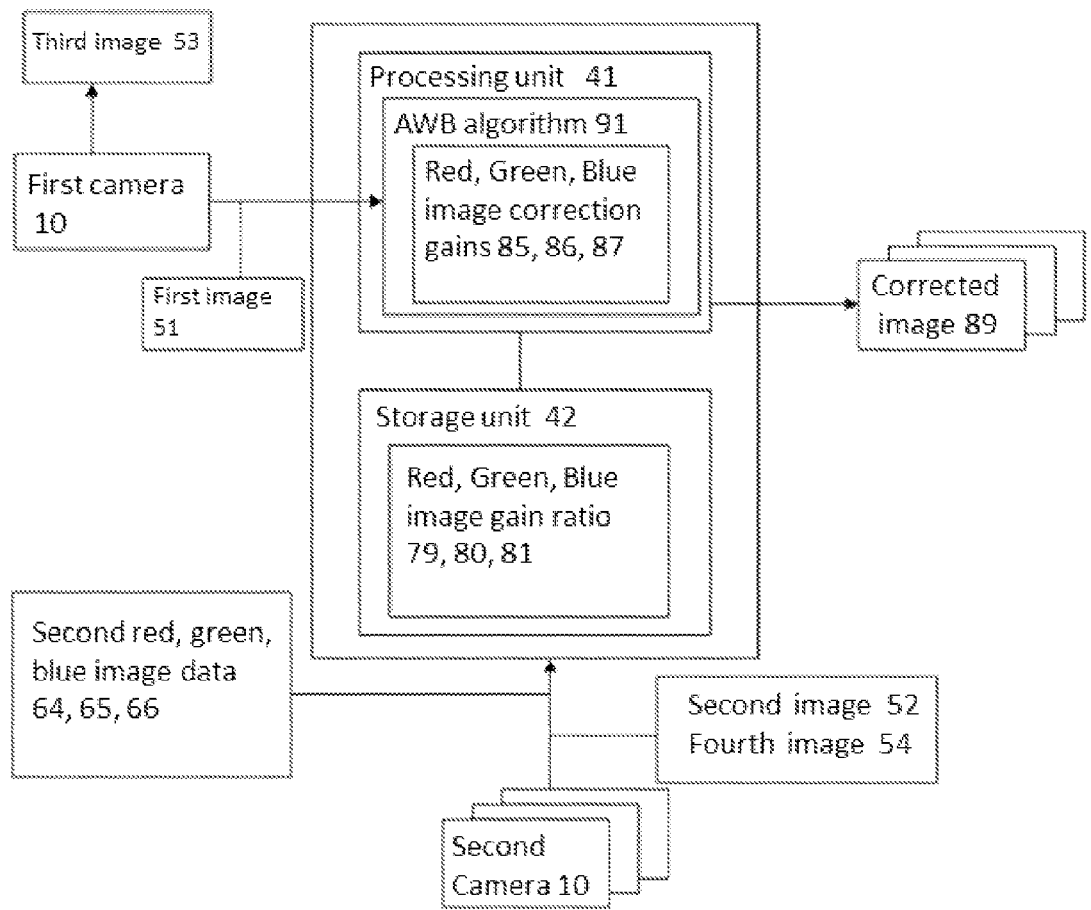
FIG. 1 is a block diagram of an exemplary embodiment of a camera array correction method according to the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which is a block diagram of an exemplary embodiment of a camera array correction method according to the present disclosure. The camera array of the exemplary embodiment comprises a first camera 10 and a plurality of second cameras 20. The camera array correction method is adapted for an image correction between the first camera 10 and each second camera 20. In this exemplary embodiment, the resolution of the first camera 10 is higher than that of the second camera 20, and both of the first camera 10 and the second camera 20 have the same exposure time. However, this case is just for example, and the present disclosure is not limited thereto.

In this camera array, the first camera 10 and the second camera 20 are used to shoot a light source, to generate a first image 51 and a second image 52. In implementation, the first camera 10 and the second camera 20 can be located on the same plane or different planes. The first image 51 and the second image 52 are calculated by the processing unit 41 and are stored in the storage unit 42. Preferably, the processing unit 41 and the storage unit 42 can be installed in an electronic device or in the second camera 20.

According to the first image 51 and the second image 52, the processing unit 41 calculates a first red image gain value, a first green image gain value, a first blue image gain value, a second red image gain value, a second green image gain value and a second blue image gain value. In implementation, the first red image gain value is the ratio of the first green image data to the first red image data, the first green image gain value is the ratio of the first green image data to the first green image data, the first blue image gain value is the ratio of the first green image data to the first blue image data, the second red image gain value is the ratio of the first green image data to the second red image data 64, the second green image gain value is the ratio of the first green image data to the second green image data 65, the second blue image gain value is the ratio of the first green image data to the second blue image data 66. The table 1 shows the exemplary brightness value of one pixel of the first image 51 and the second image 52 captured under the same light source.

TABLE 1

| the image data and the image gain values of the first image and the second image | | | | | |
|---|---|---|---|---|---|
| First image | | | Second image | | |
| First red image data | First green image data | First blue image data | Second red image data | Second green image data | Second blue image data |
| 99 | 178 | 127 | 97 | 155 | 97 |
| First red image gain value | First green image gain value | First blue image gain value | Second red image gain value | Second green image gain value | Second blue image gain value |
| 1.79798 | 1 | 1.401575 | 1.835052 | 1.148387 | 1.835052 |

The red image gain ratio 79, the green image gain ratio 80 and the blue image gain ratio 81 are obtained according to the first red image gain value, the first green image gain value, the first blue image gain value, the second red image gain value, the second green image gain value and the second blue image gain value. Preferably, the red image gain ratio 79 is the ratio of the second red image gain value to the first red image gain value, the green image gain ratio 80 is the ratio of the second green image gain value to the first green image gain value, and the blue image gain ratio 81 is the ratio of the second blue image gain value to the first blue image gain value. The red image gain ratio 79, the green image gain ratio 80 and the blue image gain ratio 81 are stored in the storage unit 42. The Table 2 shows the exemplary data of these gain ratios.

TABLE 2

| image gain ratios of the second image | | |
|---|---|---|
| Second image | | |
| Red image gain ratio | Green image gain ratio | Blue image gain ratio |
| 1.081856 | 1.148387 | 1.59732 |

When the first camera 10 and the second camera 20 shoot again to an external environment, to generate a third image 53 and a fourth image 54, the processing unit 41 can calculate the red image correction gain 85, the green image correction gain 86, and the blue image correction gain 87 of the third image 53 according to an auto white balance algorithm 91. Preferably, the auto white balance algorithm 91 may comprises Median Cut Algorithm, Voronoi Diagram or other known algorithms having the same function. The Table 3 shows the exemplary data of these image correction gains.

TABLE 3

| white balance gains of the third image |||
| --- | --- | --- |
| Third image |||
| Red image correction gain | Green image correction gain | Blue image correction gain |
| 1.06 | 1 | 1.22 |

The second camera 20 just transmits the second red image data 64, the second green image data 65 and the second blue image data 66 to the processing unit 41 for calculation, so as to generate corrected red image data, corrected green image data and corrected blue image data. The corrected red image data is obtained by multiplying the red image gain ratio 79, the red image correction gain 85 and the second red image data 64. The corrected green image data is obtained by multiplying the green image gain ratio 80, the green image correction gain 86 and the second green image data 65. The corrected blue image data is obtained by multiplying the blue image gain ratio 81, the blue image correction gain 87 and the second blue image data 66.

Furthermore, the processing unit 41 corrects the fourth image 54 according to the corrected red image data, the corrected green image data and the corrected blue image data, to generate a corrected image 89, so that image features of white balance of the corrected image 89 and the third image 53 have consistency, and both of the corrected image 89 and the third image 53 can be applied in subsequent image process, such as image combination or 3D image creation. The Table 4 shows the exemplary brightness values of the third image and the corrected image data, and brightness values of the corrected image 89 are equal to that of the third image.

TABLE 4

| image data of the third image and the corrected image ||||||
| --- | --- | --- | --- | --- | --- |
| Third image ||| Corrected image |||
| Third red image data | Third green image data | Third blue image data | Correct red image data | Correct green image data | Correct blue image data |
| 104.94 | 178 | 154.94 | 104.94 | 178 | 154.94 |

Figure 2:
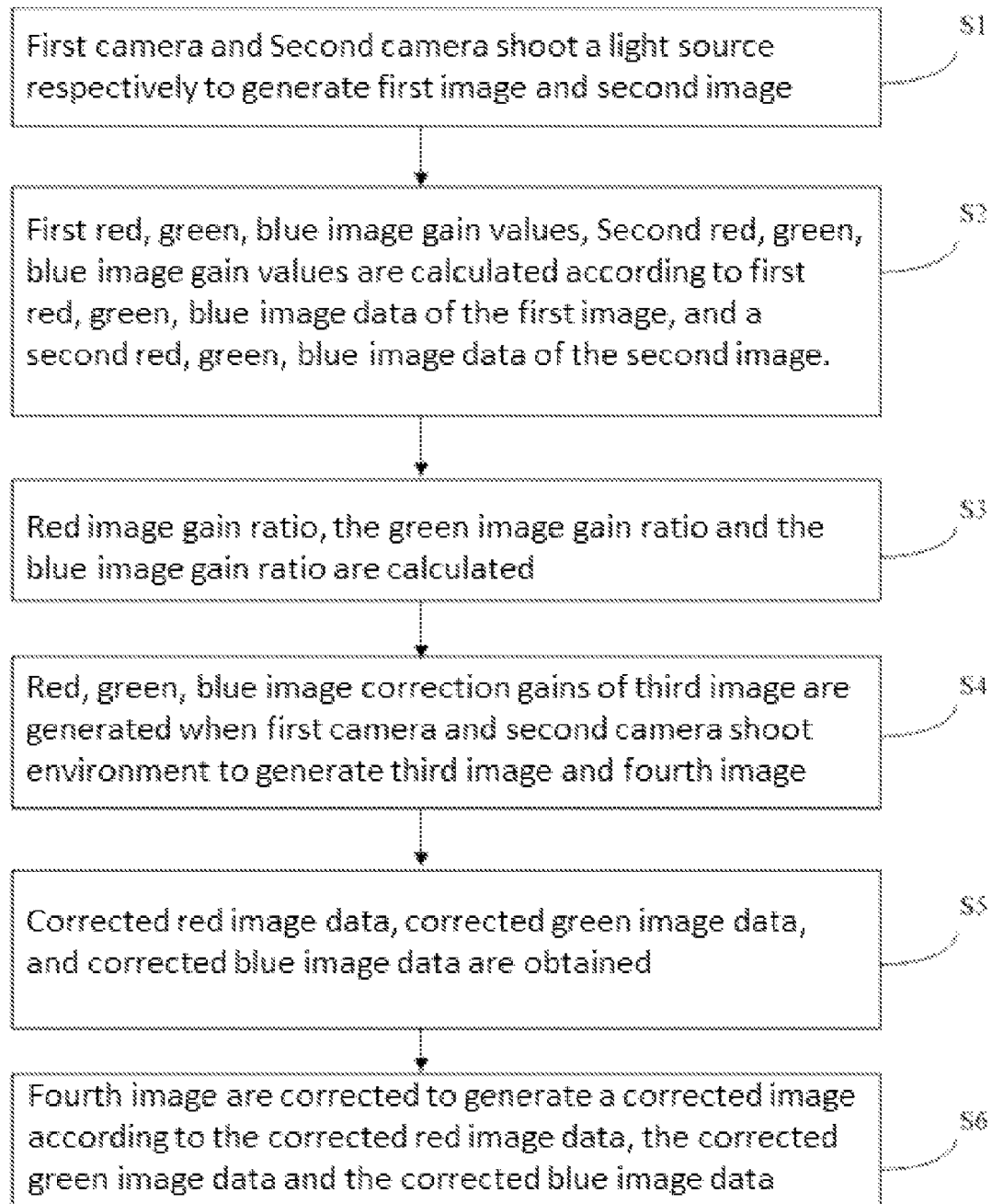
FIG. 2 is a flow diagram of another exemplary embodiment of the camera array correction method according to the present disclosure.

Please refer to FIG. 2 which is a flow diagram of another exemplary embodiment of the camera array correction method according to the present disclosure. In step S1, the first camera and the second camera are used to shoot a light source respectively, to generate a first image and a second image. In step S2, a first red image gain value, a first green image gain value, a first blue image gain value, a second red image gain value, a second green image gain value and a second blue image gain value are calculated according to a first red image data, a first green image data and a first blue image data of the first image, and a second red image data, a second green image data and a second blue image data of the second image. The detail way of calculating gain values is the same as the above-mentioned exemplary embodiment, so detail description is omitted.

In step S3, the red image gain ratio, the green image gain ratio and the blue image gain ratio are calculated. In step S4, a red image correction gain, a green image correction gain and a blue image correction gain of a third image are generated when the first camera and the second camera are used to shoot an external environment to generate the third image and a fourth image respectively. The generation way is the same as the exemplary embodiment and the data shown in table 3.

In step S5, the red image gain ratio, the red image correction gain and the second red image data are multiplied to obtain a corrected red image data, and the green image gain ratio, the green image correction gain and the second green image data are multiplied to obtain corrected green image data, and the blue image gain ratio, the blue image correction gain and the second blue image data are multiplied to obtain corrected blue image data. In step S6, the fourth image are corrected by the processing unit to generate a corrected image according to the corrected red image data, the corrected green image data and the corrected blue image data, to enable the corrected image and third image having substantially equal image features. As shown in table 4, the third image 53 and the corrected image 89 have the same brightness values.

In summary, the camera array correction method of the present disclosure can make cameras in the camera array generating images with the same brightness or color, so as to generate image features having consistency, and the amount of the calculation does not increase as the increasing of cameras.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A camera array correction method, adapted for an image correction between a first camera and a second camera, the camera array correction method comprising:

using the first camera and the second camera to shoot a light source to generate a first image and a second image;

calculating a first red image gain value, a first green image gain value, a first blue image gain value, a second red image gain value, a second green image gain value and a second blue image gain value, according to a first red image data, a first green image data and a first blue image data of the first image, and a second red image data, a second green image data and a second blue image data of the second image;

calculating a red image gain ratio, a green image gain ratio and a blue image gain ratio of the second image, wherein the red image gain ratio is a ratio of the second red image gain value and the first red image gain value, and the green image gain ratio is a ratio of the second green image gain value and the first green image gain value, and the blue image gain ratio is a ratio of the second blue image gain value and the first blue image gain value;

generating a red image correction gain, a green image correction gain and a blue image correction gain of a third image when the first sensing element array and the second sensing element array shoot an external environment to generate the third image and a fourth image respectively;

multiplying the red image gain ratio, the red image correction gain and the second red image data to obtain corrected red image data, and multiplying the green image gain ratio, the green image correction gain and the second green image data to obtain corrected green image data, and multiplying the blue image gain ratio, the blue image correction gain and the second blue image data to obtain corrected blue image data; and correcting the fourth image to generate a corrected image according to the corrected red image data, the corrected green image data and the corrected blue image data, to enable the corrected image and the third image having substantially equal image features.

2. The camera array correction method according to claim 1, wherein the first red image data or the second red image data comprises a brightness value or a white balance value of a red component image, and the first green image data or the second green image data comprises a brightness value or a white balance value of a green component image, and the first blue image data or the second blue image data comprises a brightness value or a white balance value of a blue component image.

3. The camera array correction method according to claim 1, wherein resolution of the second camera is lower than that of the first camera.

4. The camera array correction method according to claim 3, wherein the resolution of the corrected image is converted to be equal to that of the third image by an interpolation process.

5. The camera array correction method according to claim 1, wherein the first red image gain value is a ratio of the first green image data and the first red image data, the first green image gain value is a ratio of the first green image data and the first green image data, the first blue image gain value is a ratio of the first green image data and the first blue image data, the second red image gain value is a ratio of the first green image data and the second red image data, the second green image gain value is a ratio of the first green image data and the second green image data, the second blue image gain value is a ratio of the first green image data and the second blue image data.

6. The camera array correction method according to claim 1, wherein the image features comprise a white balance value and an auto exposure value.

7. The camera array correction method according to claim 1, wherein both of the corrected image and the third image are applied to subsequent image process.

* * * * *